(12) United States Patent
Wasserman

(10) Patent No.: US 9,053,144 B2
(45) Date of Patent: Jun. 9, 2015

(54) SYSTEM AND METHOD TO AUTOMATICALLY CONFIGURE A COMPONENT OF THE SYSTEM

(75) Inventor: Bernard Wasserman, Thornhill (CA)

(73) Assignee: EATON CORPORATION, Cleveland, OH (US)

(*) Notice: Subject to any disclaimer, the term of this patent is extended or adjusted under 35 U.S.C. 154(b) by 169 days.

(21) Appl. No.: 13/307,074

(22) Filed: Nov. 30, 2011

(65) Prior Publication Data

US 2013/0138672 A1    May 30, 2013

(51) Int. Cl.
| | |
|---|---|
| G06F 7/00 | (2006.01) |
| G06F 17/30 | (2006.01) |
| G06F 19/00 | (2011.01) |
| G05B 15/02 | (2006.01) |
| G06F 15/16 | (2006.01) |

(52) U.S. Cl.
CPC .......... *G06F 17/30386* (2013.01); *G05B 15/02* (2013.01); *G06F 17/30575* (2013.01)

(58) Field of Classification Search
CPC .......................... G06F 17/30386; G05B 15/02
USPC .......................................... 707/758; 700/117
See application file for complete search history.

(56) References Cited

U.S. PATENT DOCUMENTS

| | | | |
|---|---|---|---|
| 5,225,987 A * | 7/1993 | Thompson ...................... 700/97 |
| 5,596,473 A | 1/1997 | Johnson et al. |
| 5,943,201 A | 8/1999 | Walker et al. |
| 6,005,757 A | 12/1999 | Shvach et al. |
| 7,325,015 B2 * | 1/2008 | Zhou et al. ............. 707/999.102 |
| 2004/0078387 A1 * | 4/2004 | Benjamin et al. ...... 707/999.102 |
| 2005/0187912 A1 * | 8/2005 | Matsa et al. ........... 707/999.003 |
| 2008/0052295 A1 * | 2/2008 | Walker et al. ............ 707/999.01 |
| 2008/0258667 A1 | 10/2008 | Morris et al. |
| 2010/0205416 A1 * | 8/2010 | Lanner et al. ...................... 713/1 |
| 2011/0004589 A1 * | 1/2011 | Rischar et al. ................. 707/713 |
| 2011/0106318 A1 * | 5/2011 | Ledford ......................... 707/758 |
| 2012/0063354 A1 * | 3/2012 | Vanga et al. ................... 370/254 |

* cited by examiner

*Primary Examiner* — Greta Robinson
*Assistant Examiner* — Brian E. Weinrich
(74) *Attorney, Agent, or Firm* — Eckert Seamans Cherin & Mellott, LLC; Kirk D. Houser; Philip E. Levy

(57) ABSTRACT

A system and method for automatically configuring a component, such as an MCC cell), of the system includes the component, which further includes a module having storage, and a data concentrator device that is in communication with the component. The data concentrator device is in communication with a database, which may be a local ID database or a master ID database. The module stores a unique configuration code that is provided to the data concentrator device. The data concentrator device determines whether the database stores configuration information for the module that corresponds to the unique configuration code. The data concentrator device accesses the configuration information and uses it to automatically configure the component.

11 Claims, 2 Drawing Sheets

SYSTEM AND METHOD TO AUTOMATICALLY CONFIGURE A COMPONENT OF THE SYSTEM

BACKGROUND

1. Field

The disclosed concept pertains generally to systems and, more particularly, to systems, such as, for example and without limitation, motor control center (MCC) systems that include MCC cells that require configuration. The disclosed concept also pertains to methods of automatically configuring components of systems.

2. Background Information

Known motor starters, load monitoring relays and other components of motor control centers (MCCs) are configured by manually selecting parameters (e.g., manually from a component user interface or manually from a user interface of a processor or other component configuration device) for each component type. Hence, manually induced errors can and do occur.

U.S. Pat. No. 5,225,987 discloses a generic tool that is a set of software groups and subgroups specifying at each stage the elements to be manipulated and assembled within a theoretical global vertical structure. The generic tool is, thus, an abstract complex configuration representing an assembled product in its broadest spatial, structural and functional sense and it allows, for each particular application, the system to be narrowed down by calling specific features as needed at the in-plant order level. More generally, this is applicable to a machine; to a mechanical, or electrical, apparatus or system; to panel boards, switchboards, or motor control centers; to a warehouse and its stored articles; to office furniture at the supply, or at the demand end; to marketing and sales for negotiation; to a plurality of consulting advices or requests; and the like.

There is room for improvement in systems that configure system components.

There is also room for improvement in methods of configuring components of systems.

SUMMARY

These needs and others are met by embodiments of the disclosed concept, which determine if a unique configuration code for a component of a system is in a database, and responsively input configuration information from the database and automatically configure the component with the configuration information.

In accordance with one aspect of the disclosed concept, a system to automatically configure a component of the system from a database operatively associated with the system comprises: a number of components, each of the number of components comprising: a module having a unique configuration code, and a first communication interface; and a processor comprising: a second communication interface structured to communicate with the first communication interface, an interface to the database, and a routine structured to input the unique configuration code from the module, determine if the unique configuration code is in the database, and responsively input configuration information from the database and automatically configure a corresponding one of the number of components with the configuration information.

The database may be a main database; the processor may further comprise a local database operatively associated with the number of components; and the routine may be further structured to input the unique configuration code from the module, determine if the unique configuration code is in the local database, and responsively input configuration information from the local database and automatically configure the corresponding one of the number of components with the configuration information from the local database.

As another aspect of the disclosed concept, a method of automatically configuring a component of a system from a database operatively associated with the system comprises: employing the system comprising a number of components, each of the number of components comprising a module having a unique configuration code; inputting the unique configuration code from the module; and determining if the unique configuration code is in the database, and responsively inputting configuration information from the database and automatically configuring a corresponding one of the number of components with the configuration information.

The method may employ the database as a main database; operatively associate a local database with the number of components; input the unique configuration code from the module; and determine if the unique configuration code is in the local database, and responsively input configuration information from the local database and automatically configure the corresponding one of the number of components with the configuration information from the local database.

The method may employ a look-up table operatively associated with the database; and determine if the unique configuration code is in the look-up table before responsively obtaining the configuration information from the database and automatically configuring the corresponding one of the number of components with the configuration information.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a data concentrator; a programmable logic controller (PLC); or any suitable processing device or apparatus.

As employed herein, the terms "configuration information" or "configuration parameters" shall mean information employed to either configure a memory or other electronic storage device of an installed component of a system, or to monitor and/or maintain such installed component of a system. The terms "configuration information" or "configuration parameters" expressly exclude information employed to physically install a component in a system.

As employed herein, the term "unique configuration code" means being the only one used anywhere for a particular type of component. For example, a unique configuration code may be duplicated for multiple copies of the same type of component at a number of customer sites. As a further more specific example, a particular motor starter type having a common set of configuration parameters can be duplicated to provide the same application for one or more customers.

Figure 1:
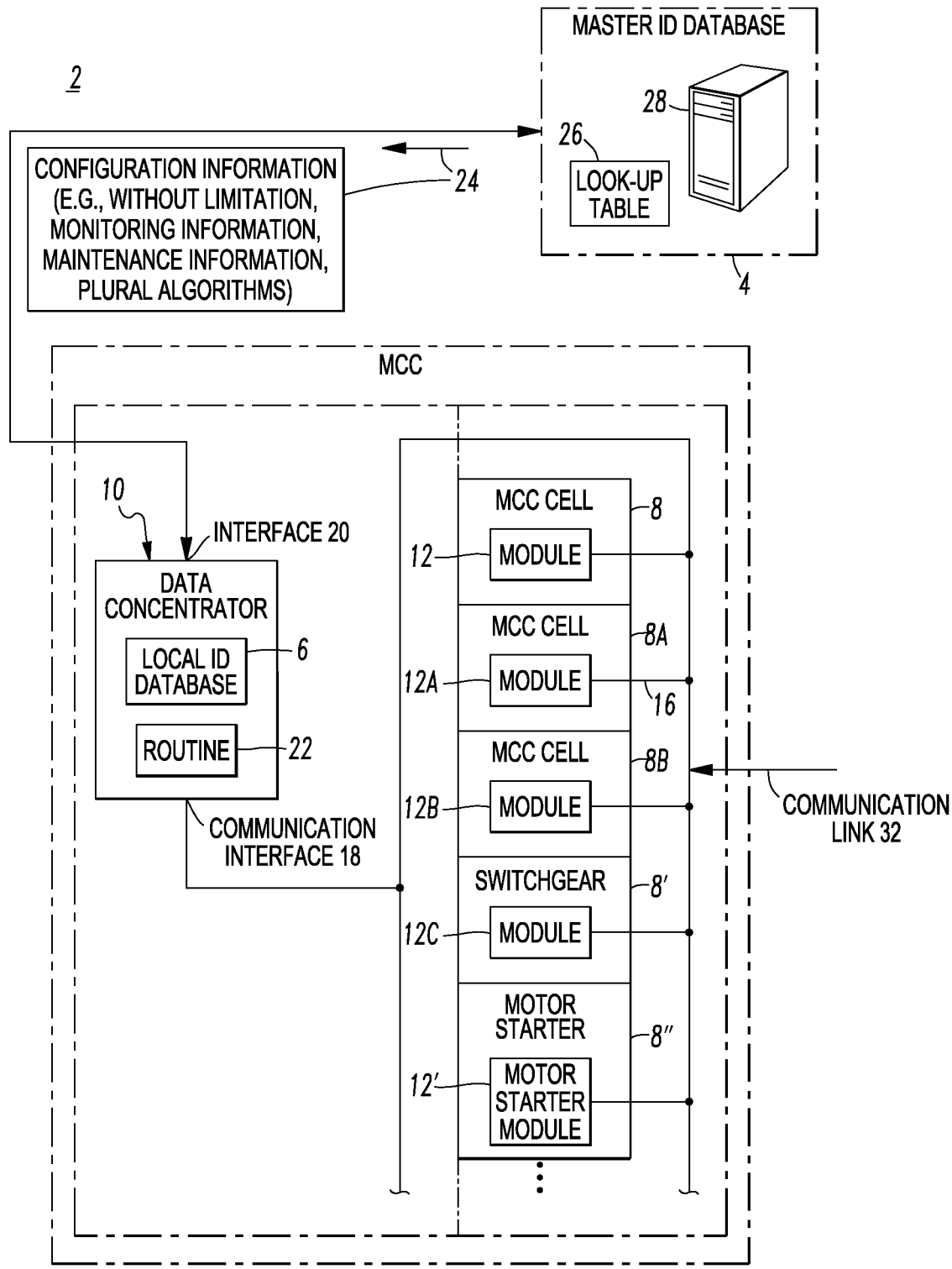
FIG. 1 is a block diagram of a system including a number of databases, a number of motor control center (MCC) cells and a data concentrator in accordance with embodiments of the disclosed concept.
Figure 2:
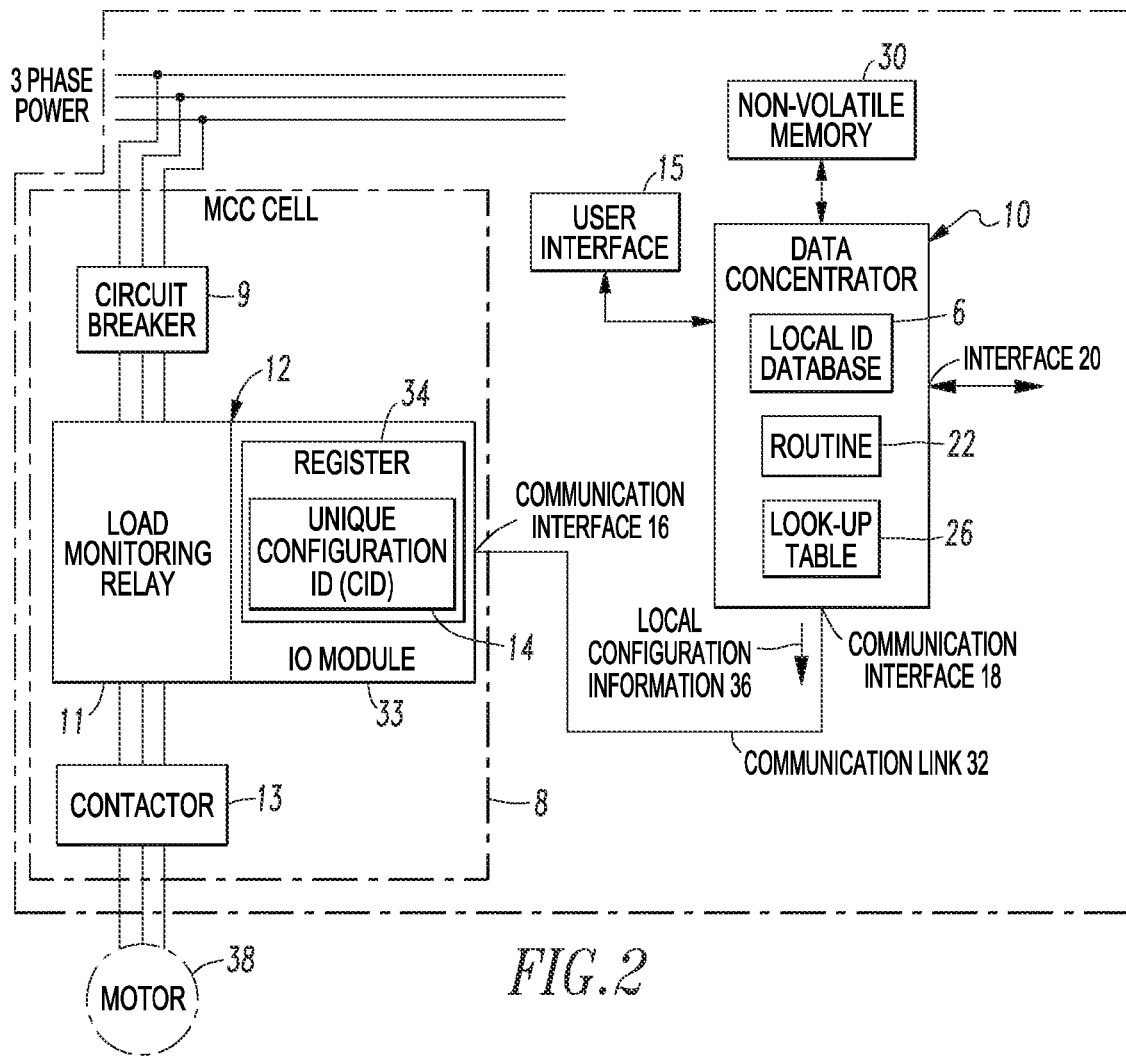
FIG. 2 is a block diagram of the data concentrator and one of the MCC cells of FIG. 1.

Referring to FIG. 1, a system 2 includes a number of databases 4,6, a number of components, such as the example motor control center (MCC) cells 8,8A,8B, switchgear 8' and motor starter 8'', and a processor, such as the example data concentrator 10. As will be explained, the system 2 automatically configures the MCC cells 8,8A,8B from one of the databases 4,6 operatively associated with (e.g., without limitation, the database 4 is in communication with the data concentrator 10 of the example system 2; the database 6 is part of the example system 2) the system 2. As best shown in FIG. 2, each of the example MCC cells 8,8A,8B and switchgear 8' includes a module, such as 12,12A,12B,12C, having a unique configuration code, such as the example configuration ID (CID) 14, and a first communication interface 16. The motor starter 8'' includes a motor starter module 12'. The data concentrator 10 includes a second communication interface 18 structured to communicate with the first communication interface 16, an interface 20 to the database 4 (FIG. 1), and a routine 22 (shown in FIG. 3) structured to input the CID 14 from the module 12, determine if the CID 14 is in the database 4, and responsively input configuration information 24 from the database 4 and automatically configure the corresponding MCC cell, such as 8, with the configuration information 24.

Example 1

The disclosed concept is described in association with the example system 2 being a motor control center (MCC) and the plurality of MCC cells 8,8A,8B being smart MCC motor starters, although the disclosed concept is applicable to a wide range of systems having a wide range of any number of suitable components. For example and without limitation, the disclosed concept may find applicability in other power connectivity configurations, adapted or apart from MCCs. A non-limiting example of supply power commonly used in MCCs is 480 V three-phase alternating current (AC) power distributed over three separate supply bus bars. In addition, references to MCC components shall be understood to include the various types of devices and control components which may be housed in a MCC bucket or cell for connection to the supply power. Such devices and components include, for example and without limitation, contactors, relays, motor controllers, disconnects, and circuit protective devices. Alternatively, the system 2 may be switchgear on a custom motor control panel.

Example 2

As a further non-limiting example, the number of components can include motor starters, switchgear, circuit interrupters, and feeders.

Example 3

The interface 20 to the database 4 can be, for example and without limitation, a global communication network, such as the Internet, or a non-volatile memory (e.g., without limitation, a CD; a USB memory device). The main database 4 can be a global database for all components supplied by a particular vendor or marketing channel, such that each of those components is identified by a unique configuration code.

Example 4

The module 12 can be a smart motor starter module including an input/output (IO) module 33 in which the unique CID 14 (e.g., without limitation, 32 bits; any suitable count of bits to provide a unique configuration code) is loaded upon successful completion of factory testing. For example, a suitable test fixture, such as the data concentrator 10 or a device (not shown) that mimics all or part of the data concentrator 10, embeds the CID 14 into a register 34 (FIG. 2) located within the IO module 33 upon successful completion of testing.

Example 5

The configuration information 24 can be, for example and without limitation, monitoring information, maintenance information, and a plurality of algorithms.

Example 6

Further to Example 5, the configuration information 24 can be, for example and without limitation, a bill of material, a cell size, a wiring diagram, a picture, a setting range, protection device information, a load type, an input/output type, an input/output configuration, a protection scheme, and an algorithm.

Each smart MCC cell, such as 8, of the example smart MCC system 2 is embedded with a unique CID 14. This unique configuration code is imbedded in a smart component of the smart MCC cell 8 and is used in a look-up table (LUT) 26 that is integrated into the smart MCC data concentrator 10 or the Internet based database 4. The database 4 is automatically accessed when the smart MCC cell 8 is first installed into the smart MCC system 2 and, as a result of a successful look-up, all pertinent data is pre-loaded into the smart MCC data concentrator 10 from the Internet based database 4, including, for example and without limitation, bills of material, cell sizes, wiring diagrams, pictures (e.g., without limitation, starter image; protection device image; assembly image; MCC cell image), internal graphics (for displayed configuration pages), setting ranges (e.g., without limitation, short circuit; thermal; ground fault), protection devices (e.g., without limitation, graphic elements; short circuit settings; overload settings; ground fault settings; protection settings; monitoring settings), load types (e.g., without limitation, full voltage non-reversing (FVNR) starter; full voltage reversing (FVR) starter; feeder; variable speed drive (VSD); soft starter), load monitoring relay type and configuration (e.g., without limitation, a number of conductors; CT ratio; current range of device (maximum and minimum defaults); number of loops through current transformers; algorithms for analysis based on load type (e.g., without limitation, valve; variable speed drive; soft-start); internal protection settings of a load monitoring relay (e.g., without limitation, unbalance; ground fault); protection scheme (e.g., without limitation, what device is being used for protection)), algorithms, size of MCC cell (e.g., without limitation, for an MCC overview page), and other suitable configuration parameters.

Example 7

The database 4 is a master ID database accessible over a global communication network, such as the Internet. The database 4 includes a suitable server 28 for both local and Internet access.

Example 8

As will be explained, below, in connection with FIG. 3, the data concentrator routine 22 automatically accesses the database 4 with the unique CID 14 when one of the smart MCC cells 8,8A,8B is first installed into the MCC system 2. The routine 22 confirms that the unique CID 14 is in the database 4 and responsively automatically configures the corresponding smart MCC cell 8 with the configuration information 24. The look-up table 26 is operatively associated with (e.g., is part of the main database 4 or part of the local database 6) the database 4, and the routine 22 determines if the unique CID 14 is in the look-up table 26 before it responsively obtains the configuration information 24 and automatically configures the corresponding smart MCC cell 8.

In addition, the data concentrator routine 22 can output the configuration information 24 to a non-volatile memory (e.g., without limitation, a compact flash card 30) when one of the smart MCC cells 8,8A,8B is first installed into the MCC system 2.

Example 9

As shown in FIG. 2, the smart MCC cell 8 can include a circuit breaker 9, a load monitoring relay 11 and a contactor 13. The first and second communication interfaces 16,18 are communication interfaces to a communication network, such as a communication link 32 between the data concentrator 10 and the number of smart MCC cells 8,8A,8B. The communication link 32 can be any suitable communication network or bus (e.g., without limitation, DeviceNet™; CANopen; Modbus®). A non-limiting example of the load monitoring relay 11 is a MOTORMENTOR® motor protection and load monitoring relay marketed by Eaton Corporation of Mississauga, Ontario, Canada.

Example 10

As shown in FIG. 2, the module 12 includes the IO module 33 (e.g., without limitation, a load monitoring relay IO module) having the register 34 readable from the communication interface 16 by the data concentrator communication interface 18. The unique CID 14 is stored in the register 34.

Example 11

Every smart MCC starter that uses, for example and without limitation, a load monitoring relay IO module is assigned a unique CID, such as CID 14. This CID 14 is embedded into the register 34 located within the IO module 33 upon successful completion of automatic starter testing. The CID 14 links to the main or master database 4 (FIG. 1) (e.g., without limitation, located on the server 28 that loads a recipe file and all supporting documents). The main database 4 provides the configuration information 24, such as configuration data, settings and reference information, to both the smart MCC cell 8 (FIG. 1) and to the data concentrator 10. The configuration information 24 pre-sets the smart MCC cell 8 (e.g., without limitation, load monitoring relay settings; IO module settings). A subset of the main database 4 (e.g., for starter assemblies used in a particular smart MCC cell, such as 8) is loaded into the data concentrator 10 and provides user configuration information that can be automatically loaded either by the user or by the smart MCC cell 8 after it is connected to the communication link 32.

Example 12

Although one IO module 33 is shown in FIG. 2, the load monitoring relay 11 can include any suitable number of IO modules. The configuration information 24 may include a plurality of IO module settings.

Example 13

The data concentrator database 6 is operatively associated with (e.g., is part of the example MCC system 2 including the MCC cells 8,8A,8B) the various MCC cells 8,8A,8B and is a subset (e.g., without limitation, for the smart MCC starters used in the particular system, such as 2) of the main database 4. This provides user configuration information that can be automatically loaded either by the user or by the smart MCC cell 8 after it is connected to the communication link 32. For example, the data concentrator routine 22 inputs the unique CID 14 from the IO module 33, determines if the unique CID 14 is in the local database 6, and responsively inputs local configuration information 36 from the local database 6 and automatically configures the corresponding one of the MCC cells 8,8A,8B with the local configuration information 36.

Example 14

The data concentrator routine 22 can add a motor starter type designation into the register 34 in an IO module, such as 33, of one of the MCC cells 8,8A,8B. This can also add database information to the non-volatile memory, such as the example smart MCC compact flash card 30, when a look-up program of the routine 22 is triggered by start of communication with a starter bucket, or when a user triggers this from a virtual button of a service page for a cell, as will be described.

Example 15

Outputting the configuration information 24 to the non-volatile memory (e.g., without limitation, the compact flash card 30) when one of the MCC cells 8,8A,8B is first installed into the MCC system 2 can be accomplished by a look-up program of the routine 22 triggered by start of communication with a starter bucket. After a particular MCC cell, such as 8, is connected to the communication link 32, it starts to send an "I'm alive message" to the data concentrator 10. When the data concentrator 10 notices that a new device has connected to the communication link 32, that was not previously there (e.g., by detecting a new CID, such as 14), the data concentrator 10 updates the parameters associated with this MCC cell 8 based on its CID.

Example 16

As another non-limiting example, the configuration information 24 can be output to the non-volatile memory, such as the example compact flash card 30, when a user triggers this action from a user interface 15 (FIG. 2) of the data concentrator 10 (e.g., a virtual button of a service page for a cell). In some instances, where the unique CID 14 does not reside in the local database 6, the data concentrator 10 will not be able to find the MCC cell's parameters within that database. In this case, default parameters are used. However, after the local database 6 has been updated (e.g., without limitation, by using a USB memory device; a LAN; the Internet), then the cell data can be automatically updated by forcing the data concentrator 10 to treat the MCC cell 8 as being newly installed from the data concentrator user interface 15.

Typically, default values for the MCC cells 8,8A,8B come from the internal or local database 6. In some instances, these values need to be adjusted for a particular load (e.g., without limitation, the example motor 38 of FIG. 2).

Example 17

A suitable field device (not shown), such as a personal computer or other device that mimics the example data concentrator 10, can provide the configuration information 24 from the main database 4 to spare modules (not shown), such as spare IO modules, for the example MCC system 2.

Example 18

A suitable device, such as the example data concentrator 10 or a device (not shown), such as a personal computer or other device that mimics the data concentrator 10, can store a subset of the main database 4 on a non-volatile memory, such as a CD, a compact flash drive or the example compact flash card 30.

Example 19

Figure 3:
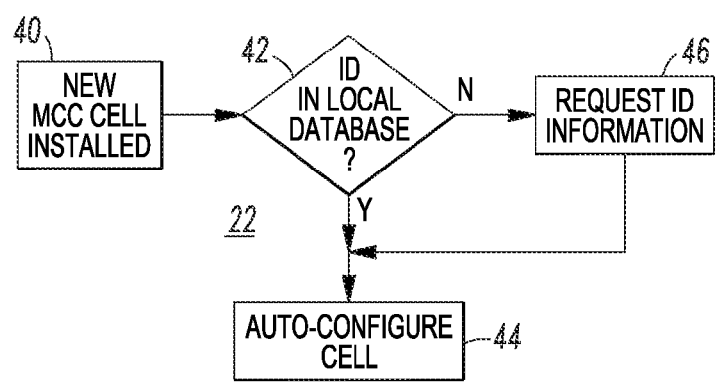
FIG. 3 is a flowchart of a routine executed by the data concentrator of FIG. 1.

The data concentrator routine 22 is shown in FIG. 3. First, at 40, after a new MCC cell, such as 8, is added to the system 2 and it sends its unique CID 14 to the data concentrator 10, the routine 22 reads that unique CID 14. Next, at 42, the routine 22 determines if the new CID 14 is in the look-up table 26 in the local database 6. If so, then the new MCC cell 8 is automatically configured at 44 using the local configuration information 36 from the local database 6. On the other hand, if the new CID 14 is not in the look-up table 26 in the local database 6 (or if there is no look-up table 26 or no local database 6), then the routine 22 requests the configuration information 24 from the main database 4, at 46, after which automatic configuration is performed at 44. Alternatively, as was discussed above in connection with Examples 3 and 16, the routine 22 can obtain this information from either the non-volatile memory, such as the example compact flash card 30, or the data concentrator user interface 15.

The disclosed concept eliminates manually selecting parameters for each starter type, thereby reducing errors. This allows the example system 2 to be dynamically configured, via the master database 4 or the local database 6, by, for example and without limitation, an end-user or system designer, without any direct engineering requirement. The disclosed concept provides relatively faster engineering since starter parameterization can be done by a system designer or end-user, and there is no need to manually load cell information into a smart MCC cell. Also, since this is automated, automatic testing and configuration leads to relatively quicker engineering and less rework due to mistakes. This also provides relatively closer integration, with a one-product-for-all concept, and greater flexibility for new component additions or starter retrofits since a new recipe needs to be created just one time.

The disclosed concept provides better testing and documentation since an automatic test fixture (not shown, but see the example data concentrator 10) can check configurations just by knowing the CID, such as 14. Automatic test reports can be generated and logged to the main database 4. This also reduces after sales support due to an improper configuration, provides simpler ordering of replacement cells, logs server logins for marketing campaigns and follow-ups, and provides the ability to offer the same product to brand label channels.

The disclosed concept can be configured without direct engineering support, permits field replacements and upgrades to be done relatively easily by updating the local database 6 from the server 28, allows for direct marketing channel customization (e.g., without limitation, tracked by server login), permits simpler ordering of replacement cells, and allows for relatively easy brand labeling and protection. For example, a CID, such as 14, can be restricted to only work with a particular marketing channel product.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A motor control center system structured to automatically configure a component of said motor control center system from a database configured to be associated with said motor control center system, said motor control center system comprising:
   a number of smart motor starters, each of said number of smart motor starters comprising:
      a module storing a unique configuration code, and
      a first communication interface; and
   a processor comprising:
      a second communication interface structured to communicate with the first communication interface,
      an interface to said database, and
      a routine structured to, when one of said number of smart motor starters is first installed into the motor control center system, (i) input the unique configuration code from said module of said one of said number of smart motor starters, (ii) automatically access said database with said inputted unique configuration code and determine whether the inputted unique configuration code is in said database, (iii) responsive to determining that the inputted unique configuration code is in said database, input configuration information associated with said inputted unique configuration code from said database and transmit said inputted configuration information to said one of said number of smart motor starters to automatically configure an electronic storage device of said one of said number of smart motor starters with said inputted configuration information, and (iv) output the inputted configuration information to a non-volatile memory.

2. The system of claim 1 wherein said inputted configuration information is selected from the group consisting of monitoring information, maintenance information, and a plurality of algorithms.

3. The system of claim 1 wherein said interface to said database is selected from the group consisting of a global communication network and a non-volatile memory.

4. The system of claim 1 wherein said module storing the unique configuration code is a motor starter module; and wherein said unique configuration code is loaded into said motor starter module upon successful completion of testing of said motor starter module.

5. The system of claim 1 wherein said inputted configuration information is selected from the group consisting of a bill of material, a cell size, a wiring diagram, a picture, a setting range, protection device information, a load type, an input/output type, an input/output configuration, a protection scheme, and an algorithm.

6. The system of claim 1 wherein said module is an input/output module including a register readable from the first communication interface by the second communication interface; and wherein said unique configuration code is stored in the register of said input/output module.

7. The system of claim 1 wherein said module of said one of said number of smart motor starters comprises a number of input/output modules; and wherein said configuration information pre-sets a plurality of input/output module settings of the number of input/output modules.

8. The system of claim 1 wherein said database is a database accessible over a global communication network.

9. The system of claim 1 wherein said database is a global database.

10. A method of automatically configuring a component of a motor control center from a database configured to be associated with said motor control center, said method comprising:
   employing said motor control center comprising a number of smart motor starters, each of said number of smart motor starters comprising a module storing a unique configuration code; and
   when one of said number of smart motor starters is first installed into the motor control center:
      (i) inputting the unique configuration code from said module of said one of said number of smart motor starters; and
      (ii) automatically accessing said database with said inputted unique configuration code and determining whether the inputted unique configuration code is in said databases;
      (iii) responsive to determining that the inputted unique configuration code is in said database, inputting configuration information associated with said inputted unique configuration code from said database and transmitting said inputted configuration information to said one of said number of smart motor starters to automatically configure an electronic storage device of said one of said number of smart motor starters with said inputted configuration information; and
      (iv) outputting the inputted configuration information to a non-volatile memory.

11. The method of claim 10 further comprising
   employing a look-up table configured to be associated with said database; and
   determining if the inputted unique configuration code is in said look-up table before said responsively obtaining the inputted configuration information from said database and automatically configuring the one of said number of smart motor starters with said inputted configuration information.

* * * * *